United States Patent Office 3,341,486
Patented Sept. 12, 1967

3,341,486
ORGANOPOLYSILOXANE COMPOSITIONS AND
A METHOD FOR MAKING THEM
Robert A. Murphy, Burnt Hills, N.Y., assignor to General
Electric Company, a corporation of New York
No Drawing. Filed Jan. 4, 1965, Ser. No. 423,312
11 Claims. (Cl. 260—18)

ABSTRACT OF THE DISCLOSURE

Organopolysiloxane compositions convertible to the elastomeric state upon exposure to moisture which utilize a mixture of aminoxy-substituted organosilicon materials to effect the polymerization of silanol-terminated organopolysiloxane. Organosilicon material having two OY radicals attached to silicon is utilized in combination with organosilicon material having at least three OY radicals attached to silicon, where Y is an amino radical, such as —N(C$_2$H$_5$)$_2$, and OY is an aminoxy radical such as —ONC(C$_2$H$_5$)$_2$. The subject organopolysiloxane compositions cure to elastomers having improved toughness and elongation and can be employed to make flexible organopolysiloxane molds.

---

The present invention relates to room temperature vulcanizing organopolysiloxane compositions. More particularly, the present invention relates to a method utilizing certain nitrogen-containing organosilicon materials to effect the polymerization of low molecular weight silanol-terminated organopolysiloxanes, and the vulcanization of the resulting organopolysiloxane polymers.

Room temperature vulcanizing organopolysiloxane compositions have been employed extensively in molding applications. The advantages achieved by using such elastomeric forming materials is that a resilient mold can be made by merely pouring the curable organopolysiloxane composition onto a pattern and allowing the curable organopolysiloxane composition to cure up. Although the employment of such room temperature curable organopolysiloxane compositions have been successfully utilized in molding applications, experience has shown that after the organopolysiloxane mold has been used to cast models for a few times it often becomes difficult to remove the mold from the cast model without damaging the mold. In instances when the original pattern had a complex structure, including deep recesses, air bubbles were often trapped in the recesses causing voids in the resulting mold.

One of the principal reasons why the removal of prior art organopolysiloxane molds from cast parts often results in mold damage, after the mold has been used only a few times, is that the mold does not possess a satisfactory elongation. The term "toughness" is often used by those skilled in the art to describe the ability of an organopolysiloxane elastomer to resist abrasion or damage. As utilized hereinafter, in the description of the present invention, the term "toughness" will represent the product of tensile (p.s.i.) and elongation (percent).

Experience has shown that prior art molds made from cured organopolysiloxane compositions vulcanizable at room temperature generally have satisfactory tensile (p.s.i.), but do not show satisfactory elongation percent. Those skilled in the art know that molds having an ultimate elongation of at least 600%, rarely exhibit a tendency to damage. Prior to the present invention, in order to insure high elongation in organopolysiloxane elastomers, it was necessary to employ high molecular weight linear polymers which could be cross-linked in a suitable manner. However, when organopolysiloxane polymers are employed in room temperature vulcanizing organopolysiloxane molding compositions, the molecular weight of the polymer which can be employed is severely restricted. To provide for a sufficient degree of fluidity in the curable mixture, particularly when filler is utilized to toughen the walls of the resulting mold, low molecular weight organopolysiloxane polymers must be utilized to minimize viscosity build-up. As a result, molds made from room temperature vulcanizing organopolysiloxane compositions rarely have mold walls exhibiting an ultimate elongation of at least 600%. The organopolysiloxane polymers used in the compositions must be of relatively low molecular weight to minimize viscosity build-up. The resulting mold therefore, suffers from reduced toughness.

The present invention is based on the discovery that a mixture of (A) a silanol-terminated polydiorganosiloxane consisting essentially of chemically combined units of the formula, (1) 

and (B) a mixture of nitrogen-silicon materials, referred to hereinafter sometimes as "aminoxy materials," having radicals of the formula, (2)                         —OY attached to silicon can provide for room temperature vulcanizing organopolysiloxane compositions useful for making molds having a high degree of elongation, where (A) has a ratio of about 1.95 to about 2 R radicals per silicon atom, Y is a monovalent amine radical selected from —NR'$_2$, and a heterocyclic amine attached to silicon by an SiON linkage, R is selected from monovalent hydrocarbon radicals, halogenated monovalent hydrocarbon radicals and cyanoalkyl radicals, and R' is a monovalent hydrocarbon radical. The above nitrogen-silicon materials and methods for making them are shown in my copending application Serial No. 423,354 filed concurrently herewith and assigned to the same assignee as the present invention.

There is provided by the present invention room temperature vulcanizing organopolysiloxane compositions comprising (A) 100 parts of a silanol-terminated polydiorganosiloxane consisting essentially of chemically combined units of Formula 1, (B) and 0.1 to 100 parts of a mixture consisting of:

(a) a difunctional nitrogen-silicon material having attached to silicon, two radicals of Formula 2 which has the structural unit of the formula, (3) 

and, (b) from 0.1% to 50% by weight of (a) of a polyfunctional nitrogen-silicon material attached to silicon having at least three radicals of Formula 2, which has the structural unit of the formula, (4)                         ≡SiOY where Y is defined above, R" is a member selected from R' radicals, alkoxy radicals, and triorganosiloxy radicals, and the remaining valences of the silicon atoms of the structural unit of Formulas 3 and 4 respectively, other than those satisfied by OY radicals, are satisfied by a member selected from oxygen, divalent hydrocarbon radicals, and R" radicals, and mixtures thereof.

Radicals included by R of Formula 1, are for example, monovalent aryl radicals and halogenated monovalent aryl radicals, such as phenyl, xylyl, chlorophenyl, naphthyl; aralkyl radicals, such as benzyl, phenylethyl, aliphatic and cycloaliphatic radicals, such as alkyl, alkenyl, cycloalkyl, haloalkyl, such as methyl, ethyl, propyl, chloropropyl, vinyl, allyl, trifluoropropyl, cyclohexyl, etc; cyanoalkyl radicals, such as cyanoethyl, cyanopropyl, cyanobutyl, etc. Radicals included by R' are all of the aforementioned monovalent hydrocarbon radicals included by R. Radicals included by R" are all of the aforementioned monovalent hydrocarbon radicals and halogenated monovalent hydrocarbon radicals included by R, and methoxy, ethoxy, butoxy, etc; trimethylsiloxy, dimethylphenylsiloxy, etc. In the above formulae where R, R' and R" can represent more than one radical, these radicals can be all the same or any two or more of the aforementioned radicals, respectively.

Included by the difunctional nitrogen-silicon materials having the structural unit of Formula 3 are diaminoxy silanes having the formula, (5) $(R'')_2Si[OY]$ diaminoxy organosilicon materials of the formula, (6) 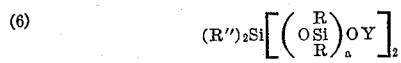

where R, R" and Y are as defined above, and $a$ is an integer equal to 1 to 10, inclusive. In addition to the above diaminoxy containing materials, there also can be employed in the practice of the invention, diaminoxy cyclopolysiloxanes containing two aminoxyorganosiloxy units of the formula, (7) 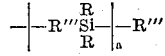

chemically combined with 1 to 6 diorganosiloxy units of Formula 1. There also can be employed linear diaminoxy organopolysiloxanes containing two units of Formula 7 chemically combined with from 1 to 18 units of Formula 1, and chain-stopped with triorganosiloxy units of the formula, (8) $(R)_3SiO_{.5}$ There are also included in the practice of the invention diaminoxy organosilicon materials of the formula, (9) 

where R is defined above, and A is selected from oxygen, R"' radicals, and

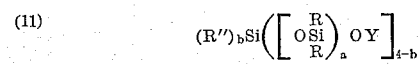

where $a$ is defined above, and R"' is a divalent hydrocarbon radical.

The polyfunctional nitrogen-silicon materials that can be employed in the practice of the invention include polyaminoxy silanes of the formula,

(10) $(R'')_bSi[OY]_{4-b}$ and nitrogen-silicon materials of the formula,

(11) 

where R" and X are defined above, and $b$ is a whole number equal to 0 or 1.

In addition to the above described polyfunctional nitrogen-silicon materials, there are also included cyclic polysiloxanes of from 3 to 8 chemically combined siloxy units, of which there are present at least 3 units of Formula 7 chemically combined with up to 5 units of Formula 1. In addition, there are also included linear organopolysiloxanes composed of at least 3 chemically combined units of Formula 7 and up to 15 units of Formula 1 and chain-stopped with units of Formula 8.

Included by the diaminoxy silicon materials that can be employed in the practice of the invention are the following:

$(CH_3)_2Si[ON(CH_2CH_3)_2]_2$ $(C_6H_5)_2Si[ON(CH_3)(C_2H_5)]_2$ $(CH_3CH_2O)_2Si[ON(CH_2CH_2CH_3)_2]_2$ $[(CH_3)_3SiO]_2Si[ON(CH_2CH_3)_2]_2$

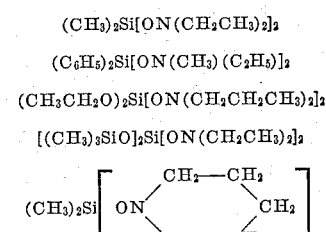

Some of the polyaminoxysilicon materials that can be employed are the following, $Si[ON(C_3H_7)_2]_4$, $Si[ON(CH_3)C_6H_5]_4$ $C_6H_5Si[ON(C_6H_5)_2]_3$, $ClC_6H_4[ON(CH_3)(C_3H_7)]_3$ $Si[OSiON(CH_2CH_3)_2]_4$ (with CH_3 groups), $CH_3Si[OSiON(CH_2CH_3)_2]_3$ (with CH_3 groups)

$C_6H_5Si[OSiON(CH_3)(C_6H_5)]_3$

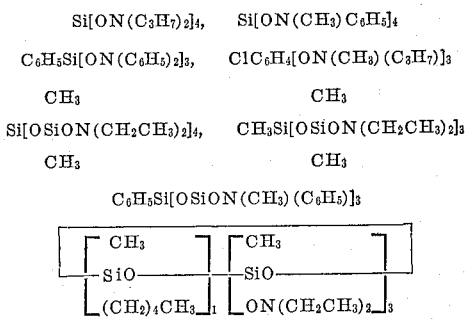

The silanol-terminated polydiorganosiloxane consisting essentially of chemically combined units of Formula 1 which can be utilized in the practice of the invention can be made by effecting the polymerization of cyclic diorganosiloxane consisting essentially of chemically combined units of Formula 1, for example octamethylcyclotetrasiloxane, octaphenylcyclotetrasiloxane, etc., by heating such cyclics with a siloxane rearrangement catalyst such as potassium hydroxide, tetrabutyl phosphonate, etc., at a temperature in the range of between 125° C., and 150° C.; there can be added to the resulting mixture a high molecular weight polymer for example, polydimethylsiloxane, increments of water until a product is produced having a viscosity of at least 10 centipoises at 25° C.; in addition to the units of Formula 1, the silanol-terminated polydiorganosiloxane of the invention can contain minor amounts of organosiloxy units such as methylsiloxy units, etc. Preferably, a viscosity of between about 100 to 100,000 centipoises at 25° C. can be employed, however, a viscosity of up to about 500,000 centipoises at 25° C. will provide for effective results.

In addition to the aforementioned materials that are utilized in the organopolysiloxane compositions of the present invention there also can be utilized fillers such as calcium carbonate, ferric oxide, fumed silica, diatomaceous earth, etc. A proportion of from 10 parts to 300 parts of filler, based on the weight of the organopolysiloxane compositions, can be utilized. In addition, curing accelerators in the form of metal salt catalysts such as zinc octoate, lead octoate, tin octoate, etc., and other metal salts of carboxylic acids having from 1 to 8 carbon atoms have been found to be effective for accelerating the cure of the compositions of the present invention. In particular instances, the compositions of the present invention can be employed without filler. Although the organopolysiloxane compositions of the present invention can preferably be employed in molding applications, other applications include construction sealants, caulking compounds, etc. The exact amount of filler therefore, will depend upon such factors as the application for which the organopolysiloxane composition is intended, and type of filler utilized.

As taught in Patent 3,296,199, Murphy, assigned to the same assignee as the present invention, contact between a hydroxy organosilicon material such as the silanol-terminated polydiorganosiloxane consisting essentially of units of Formula 1, and a nitrogen-silicon material containing units of Formula 2 results in the formation of siloxane linkages and the corresponding hydroxylamine, as shown by the following equation,

(12) $=\overset{R''}{\text{Si}}OY + HO\overset{R}{\text{Si}}= \longrightarrow \overset{R''}{\text{Si}}O\overset{R}{\text{Si}} + YOH$ The above result can be effected at a temperature between 0° C. to 200° C. Lower temperatures also can be employed, however, the rate of the reaction will be considerably slower. One theory, as shown by the above equation, is that the diaminoxysilicon material of the invention provides for a build-up of the molecular weight of the silanol-terminated polydiorganosiloxane, while the polyaminoxysilicon material is believed to provide for crosslinking at certain of the terminal sites resulting from the reaction of the silanol-terminated polydiorganosiloxane and the polyaminoxysilicon material. The employment of an amount of nitrogen-silicon material in the organopolysiloxane composition of the present invention which is sufficient to provide for an excess of radicals of Formula 2, exceeding the silanol radicals of the silanol-terminated polydiorganosiloxane of the present invention, will result in the production of a mixture of ingredients consisting of a reaction product of the silanol polydiorganosiloxane and the nitrogen-silicon material having terminal radicals of Formula 2, as well as unreacted nitrogen-silicon material in the event excessive amounts of nitrogen-silicon material are employed. It has been found that if such mixtures are made from substantially anhydrous ingredients, and under substantially anhydrous conditions, so that the resulting mixture has no more than 100 parts of water per million parts of mixture, it will remain in a fluid state for an extended period of time, such as 6 months or more, if kept out of contact from water or other hydroxylated material.

In the practice of the invention, the organopolysiloxane compositions can be made by mixing together the silanol-terminated polydiorganosiloxane, hereinafter referred to as the "silanol-polymer," and the mixture of the diaminoxysilicon material and polyaminoxysilicon material, hereinafter referred to collectively as the "nitrogen-silicon material" which preferably contains from 0.5 to 25 parts of the polyaminoxysilicon material, per 100 parts of the diaminoxysilicon material. In addition, other ingredients such as a filler, curing accelerator, etc. also can be added.

Experience has shown that optimum results can be achieved if the components of the mixture, as well as the resulting mixture, are not exposed to excessive amounts of moisture, since the nitrogen-silicon material readily hydrolyzes to silanol and hydroxyl amine. Depending upon the application to which the organopolysiloxane composition is to be utilized, the order of addition of the various components, as well as the type of components, can vary.

It has been found that the amount of the nitrogen-silicon material that can be effectively utilized will vary widely depending upon the viscosity of the silanol polymer. It is preferred to utilize sufficient nitrogen-silicon material in combination with the silanol-polymer to provide for at least a stoichiometric amount of radicals of Formula 2 referred to hereinafter as "aminoxy radicals," which are equal to the silanol radicals of the mixture such as for example, from 1 to 25 parts of the nitrogen-silicon material, per 100 parts of silanol-polymer. For example, when utilizing a high viscosity silanol-polymer, such as about 50,000 centipoises at 25° C., less nitrogen-silicon material will be required than if the silanol-polymer is as low as 1,000 centipoises at 25° C. Less than stoichiometric amounts of nitrogen-silicon material can be effectively utilized, however, but this practice often does not provide for optimum results. If a considerable excess of nitrogen-silicon material is utilized, such as an amount that provides for about ten times or more of the aminoxy radicals to silanol radicals in the mixture, it has been found that the organopolysiloxane composition will have a longer curing time as well as a longer pot life. In such circumstances, if it is desired to accelerate the cure time or shorten the pot life of the organopolysiloxane composition, the excess nitrogen-silicon material can be stripped from the mixture or a curing accelerator can be utilized. Cure times of one hour or less to 24 hours or more are not unusual, depending upon the amount and type of the nitrogen-silicon materials utilized. It has been found for example, that the nitrogen-silicon materials composed of chemically combined units of Formula 1 and Formula 7 provide for shorter pot life and reduced cure times while slower cure times are achieved with nitrogen-silicon materials of Formula 6 or Formula 9.

As previously described, the organopolysiloxane compositions can be made in accordance with the practice of the invention which can be stored for extended periods of time, such as 6 months or more and utilized in a suitable application. The cure of this organopolysiloxane composition can be effected by exposing it to a hydroxylated material such as water or the moisture in the atmosphere to effect the hydrolysis of terminal aminoxy radicals, to silanol radicals which will result which will provide for further interaction with aminoxy radicals in the mixture. By this mechanism, the molecular weight of the silanol polymer is built-up in a linear fashion while simultaneously the effect of such contact with the water can provide for hydrolysis and reaction with some of the polyfunctional aminoxy units to effect cross-linking and the vulcanization of silanol-polymer.

In order that those skilled in the art will be able to practice the invention, the following examples are given by way of illustration and not by way of limitation. All parts are by weight.

*Example 1*

One hundred parts of a silanol-terminated polydimethylsiloxane having a viscosity of 3,000 centipoises at 25° C., were mixed with four parts of a mixture consisting of a diaminoxysilicon material composed of two units of the formula,

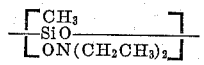

chemically combined with two units of the formula,

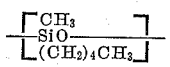

and a triaminoxysilicon material of the formula,

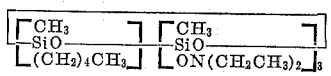

utilizing 99 parts of the diaminoxy-silicon material per part of triaminoxysilicon material. The resulting mixture was poured onto a metal plate and allowed to stand for 4 days in a moist atmosphere at an R.H. of 50%, at 25° C. A cured film was obtained. A test slab was cut from the film; it showed an elongation of 1800% and a tensile of 32.4 (p.s.i.).

*Example 2*

One hundred parts of the above-described silanol-terminated polydimethylsiloxane of Example 1 were mixed with 4 parts of various mixtures of nitrogen-silicon materials consisting of a diaminoxysilicon material,

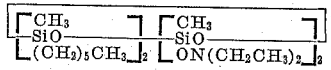

and a triaminoxysilicon material,

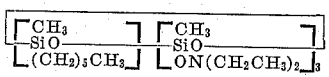

The compositions of these mixtures are shown below.

TABLE I

| Mixture | Difunctional | Trifunctional |
|---|---|---|
| A | 107 | 2 |
| B | 111 | 5.6 |
| C | 112.5 | 11.5 |
| D | 98 | 20 |

The respective mixtures of 100 parts of the silanol-terminated polydimethylsiloxane and 4 parts of the above-described mixtures of nitrogen-silicon materials of Table I were exposed to the atmosphere for a period of 4 days at 25° C. The following results were obtained when test slabs were cut from the films which had formed, where "Mixture" indicates the mixtures of nitrogen-silicon material shown in Table I, "E" is Elongation (percent), and "T" is Tensile (p.s.i.).

TABLE II

| Mixture | E | T |
|---|---|---|
| A | 1,100 | 60 |
| B | 775 | 68 |
| C | 1,200 | 60 |
| D | 700 | 73 |

*Example 3*

A mixture of 100 parts of the silanol-terminated polydimethylsiloxane of Example 1, 4 parts of the mixture of diaminoxysilicon material and triaminoxysilicon material of Example 2, and 50 parts of calcium carbonate was exposed to the atmosphere for a period of 48 hours at 25° C. and a relative humidity of 50%. A test slab was cut from a cured film which was obtained. The cured composition showed an elongation of 1500%.

*Example 4*

The procedure of Example 3 was repeated except that there was utilized in place of the calcium carbonate, 40 25 parts of a finely divided diatomaceous earth, and 25 parts of zinc oxide. A test slab was cut from the cured film. It showed an elongation of 1000%.

*Example 5*

A mixture of 100 parts of the silanol-terminated polydimethylsiloxane, 50 parts of calcium carbonate, 4 parts of the diaminoxysilicon material of Example 1, and 0.24 part of the triaminoxysilicon material of Example 1, and 1 part of dibutyl tin dilaurate was poured onto a metal plate. It was exposed to the air at 50% relative humidity and a temperature of 25° C. A cured film was obtained in 12 hours. A test slab showed a tensile of 150 (p.s.i.) and an elongation of 1200%.

*Example 6*

There was stirred under substantially anhydrous conditions for a period of about 15 hours, 100 parts of a silanol-terminated polydimethylsiloxane having a viscosity of about 2800 centipoises at 25° C., 10 parts of a mixture consisting of $(CH_3)_2Si[ON(CH_2CH_3)_2]_2$, and 2% by weight thereof of

The mixture was stripped of volatiles and then stored in a sealed container.

After being stored for 6 months in a sealed container at 25° C., the mixture is poured onto a metal plate under atmospheric conditions. It is found that the mixture cures to a film after several days. Test slabs of the film show physicals similar to the physicals shown in the above examples.

Based on the above results, those skilled in the art would know that the organopolysiloxane compositions of the present invention provide for organopolysiloxane elastomers having substantially improved elongation over room temperature vulcanizing compositions of the prior art. In addition, the organopolysiloxane compositions of the present invention can be utilized in molding applications to produce organopolysiloxane molds having improved toughness. The above examples also show that the organopolysiloxane compositions of the present invention can be advantageously utilized in a variety of applications after being stored for an extended period of time.

While the foregoing examples have shown the employment of only a few of the very many nitrogen-silicon materials that can be used in the practice of the present invention, in combination with silanol-terminated polydiorganosiloxanes, it should be understood that the present invention is directed to a much broader class of room temperature vulcanizing organopolysiloxane compositions that can be made by employing any one of the above-described nitrogen-silicon materials shown in Formulas 5, 6, 7, 8 and 9, with any one of the variety of silanol terminated polydiorganosiloxanes consisting essentially of units of Formula 1. In addition, the method of the present invention is broadly directed to a combination of these materials with other ingredients such as various metal soap accelerators, in addition to the employment of water to achieve the cure of the composition of the present invention.

What I claim as new and desire to secure by Letters Patent of the United States is:

1. A composition protected from moisture and curable to the solid elastic state upon exposure to moisture consisting essentially of (A) 100 parts of a silanol-terminated organopolysiloxane consisting essentially of chemically combined units of the formula,

and (B) 0.1 to 100 parts of a mixture consisting essentially of
  (a) diaminoxy organosilicon material having attached to silicon, two aminoxy radicals of the formula —OY, and
  (b) from 0.1% to 50% by weight (a) of polyaminoxyorganosilicon material having attached to silicon at least three of said aminoxy radicals,
where said diaminoxyorganosilicon material and said polyaminoxyorganosilicon of (B) are members selected from the class consisting of organosilanes, linear organopolysiloxanes, cycloorganopolysiloxanes, bis(silyl)hydrocarbons and combinations thereof, wherein the monovalent organo radicals attached to silicon, other than the OY radicals, are members selected from the class consisting of monovalent cyanoalkyl, alkoxy and $(R)_3SiO_{0.5}$ where R is a member selected from the class consisting of monovalent hydrocarbon radicals, halogenated monovalent hydrocarbon radicals, and cyanoalkyl radicals, Y is a monovalent amine radical selected from the class consisting of —NR′$_2$ and a heterocyclic amine radical attached to silicon by a silicon oxygen nitrogen linkage, and R′ is a monovalent hydrocarbon radical.

2. The composition of claim 1, where said silanol-terminated organopolysiloxane has a viscosity of between 100 to 100,000 centipoises at 25° C.

3. The composition in accordance with claim 1, which contains filler.

4. The composition in accordance with claim 1, in which the diaminoxyorganosilicon material of said mixture has the formula:

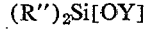

and the polyaminoxyorganosilicon material of said mixture has the formula:

where Y is a monovalent amine radical selected from the class consisting of —NR′$_2$ and a heterocyclic amine attached to silicon by a silicon-oxygen-nitrogen linkage, R″ is a member selected from the class consisting of R′ radicals, alkoxy radicals, and (R)$_3$SiO$_{0.5}$, R′ is a monovalent hydrocarbon radical and $b$ is a whole number equal to 0 or 1.

5. A composition in accordance with claim 1, in which the diaminoxyorganosilicon material is a cyclopolysiloxane containing 2 aminoxyorganosiloxy units of the formula:

chemically combined with from 1 to 6 diorganosiloxy units of the formula:

and the polyaminoxyorganosilicon material is a cyclopolysiloxane containing 3 to 8 chemically combined siloxy units in which there are at least 3 of said aminoxyorganosiloxy units chemically combined with up to 5 of said diorganosiloxy units, where Y is a monovalent amine radical selected from the class consisting of —NR′$_2$ and a heterocyclic amine attached to silicon by a silicon-oxygen-nitrogen linkage, R′ is a monovalent hydrocarbon radical, and R is a member selected from the class consisting of monovalent hydrocarbon radicals, halogenated monovalent hydrocarbon radicals, and cyanoalkyl radicals.

6. A composition protected from moisture curable to the solid elastic state upon exposure to moisture consisting essentially of (A) 100 parts of a silanol-terminated polydimethylsiloxane having a viscosity of between 100 to 100,000 centipoises at 25° C, (B) 1 to 25 parts of a mixture consisting essentially of
 (a) a diaminoxyorganosilicon material having attached to silicon, 2 aminoxy radicals of the formula ON(C$_2$H$_5$)$_2$, and
 (b) from 0.5% to 25% by weight of (a) of a triaminoxy organosilicon material having attached to silicon at least three of said aminoxy radicals,
and (C) a metal salt of a carboxylic acid having from 1 to 8 carbon atoms, where said diaminoxyorganosilicon material and said polyaminoxyorganosilicon material of (B) are members selected from the class consisting of organosilanes, linear organopolysiloxanes, cycloorganopolysiloxanes, and bis(silyl)-hydrocarbons and combinations thereof, wherein the monovalent organo radicals attached to silicon, other than the diethylaminoxy radicals, are members selected from the class consisting of monovalent hydrocarbon, halogenated monovalent hydrocarbon, monovalent cyanoalkyl, alkoxy and triorganosiloxy radicals.

7. A composition in accordance with claim 6, where said diaminoxyorganosilicon material has the formula:

(CH$_3$)$_2$Si[ON(CH$_2$CH$_3$)$_2$]$_2$ and said triaminoxyorganosilicon material has the formula:

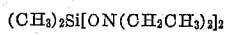

8. A composition in accordance with claim 6, where said diaminoxyorganosilicon material is a cyclopolysiloxane composed of two units of the formula:

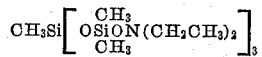

chemically combined with two amylmethylsiloxy units, and said triaminoxyorganosilicon material has the formula:

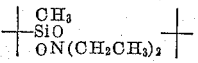

9. A method for making room temperature vulcanizing organopolysiloxane compositions which are curable to the solid elastic state upon exposure to moisture comprising mixing together under substantially anhydrous conditions (A) an effective amount of a metal salt of a carboxylic acid having from 1 to 8 carbon atoms, (B) a silanol-terminated organopolysiloxane consisting essentially of chemically combined units of the formula

and (C) 0.1 to 100 parts of a mixture of aminoxy substituted organosilicon materials selected from the class consisting of organosilanes, linear organopolysiloxanes, cycloorganopolysiloxanes, bis (silyl) hydrocarbons, and combinations thereof, wherein the monovalent organo radicals attached to silicon, other than the OY radicals, are members selected from the class consisting of monovalent hydrocarbon, halogenated monovalent hydrocarbon, monovalent cyanoalkyl, alkoxy and (R)$_3$SiO$_{0.5}$ radicals, which mixture of (C) consists essentially of
 (a) a diaminoxyorganosilicon material having attached to silicon, two aminoxy radicals of the formula —OY, and
 (b) from 0.1% to 50% by weight (a) of a polyaminoxyorganosilicon material having attached to silicon at least three of said aminoxy radicals,
where R is a member selected from the class consisting of monovalent hydrocarbon radicals, halogenated monovalent hydrocarbon radicals, and cyanoalkyl radicals, Y is a monovalent amine radical selected from the class consisting of —NR′$_2$ and a heterocyclic amine radical attached to silicon by a silicon oxygen nitrogen linkage, and R′ is a monovalent hydrocarbon radical.

10. A method in accordance with claim 9, where the metal soap is a salt of a carboxylic acid having from 1 to 8 carbon atoms of a metal selected from the class consisting of lead, tin, and zinc.

11. A method in accordance with claim 9, where the metal soap is dibutyl tin dilaurate.

References Cited
UNITED STATES PATENTS

| | | | |
|---|---|---|---|
| 2,955,127 | 10/1960 | Pike | 260—448.211 |
| 3,105,061 | 9/1963 | Bruner | 260—46.5 |
| 3,133,110 | 4/1964 | Morehouse et al. | 260—448.2 |
| 3,280,072 | 10/1966 | Frankland et al. | 260—18 |
| 3,296,199 | 1/1967 | Murphy | 260—46.5 |

DONALD E. CZAJA, *Primary Examiner.*

LEON J. BERCOVITZ, *Examiner.*

M. I. MARQUIS, *Assistant Examiner.*